(12) United States Patent
Hu et al.

(10) Patent No.: US 11,313,694 B2
(45) Date of Patent: Apr. 26, 2022

(54) METHOD AND APPARATUS FOR RECOMMENDING TRAVEL WAY

(71) Applicant: BAIDU ONLINE NETWORK TECHNOLOGY (BEIJING) CO., LTD., Beijing (CN)

(72) Inventors: Renjun Hu, Beijing (CN); Hao Liu, Beijing (CN); Hui Xiong, Beijing (CN); Ting Li, Beijing (CN); Yanjie Fu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 225 days.

(21) Appl. No.: 16/743,889

(22) Filed: Jan. 15, 2020

(65) Prior Publication Data
US 2020/0225055 A1 Jul. 16, 2020

(30) Foreign Application Priority Data
Jan. 16, 2019 (CN) .......................... 201910040830.X (51) Int. Cl.
| G01C 21/36 | (2006.01) |
| G01C 21/34 | (2006.01) |
| G06N 3/04 | (2006.01) |

(52) U.S. Cl.
CPC ....... *G01C 21/3617* (2013.01); *G01C 21/343* (2013.01); *G01C 21/3446* (2013.01); *G01C 21/3484* (2013.01); *G06N 3/0472* (2013.01)

(58) Field of Classification Search
CPC .............. G01C 21/3617; G01C 21/343; G01C 21/3446; G01C 21/3484; G01C 21/3415;
(Continued)

(56) References Cited

U.S. PATENT DOCUMENTS

| 2009/0184688 A1 | 7/2009 | Kim et al. |
| 2010/0033139 A1 | 2/2010 | An |

(Continued)

FOREIGN PATENT DOCUMENTS

| CN | 105547306 A | 5/2016 |
| CN | 106202252 A | 12/2016 |

(Continued)

OTHER PUBLICATIONS

CN108829744A English Translation.*

(Continued)

*Primary Examiner* — Rami Khatib
(74) *Attorney, Agent, or Firm* — Lathrop GPM LLP (57) ABSTRACT

The present disclosure provides a method and an apparatus for recommending a travel way. The method includes: obtaining historical travel data; determining a plurality of correlations between respective travel ways according to the historical travel data; generating a vector corresponding to each travel way according to the plurality of correlations between respective travel ways; performing learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair; and recommending a travel way according to the vector corresponding to each travel way, the vector corresponding to each user and the vector corresponding to each starting-and-arrival pair.

15 Claims, 2 Drawing Sheets

(58) Field of Classification Search
CPC .. G01C 21/3461; G06N 3/0472; G06N 20/00; G06Q 10/04; G06Q 50/26
See application file for complete search history.

(56) References Cited

U.S. PATENT DOCUMENTS

| | | | |
|---|---|---|---|
| 2011/0109435 | A1 | 5/2011 | Bickel et al. |
| 2012/0265433 | A1 | 10/2012 | Viola et al. |
| 2013/0185235 | A1* | 7/2013 | Okamoto ............... G06N 20/00 706/13 |

FOREIGN PATENT DOCUMENTS

| | | |
|---|---|---|
| CN | 107194762 A | 9/2017 |
| CN | 108154253 A | 6/2018 |
| CN | 108829744 A | 11/2018 |
| CN | 108829852 A | 11/2018 |
| CN | 109062914 A | 12/2018 |

OTHER PUBLICATIONS

Chinese Patent Application No. 201910040830.X Office Action dated Jun. 28, 2021, 8 pages.

Chinese Patent Application No. 201910040830.X English translation of Office Action dated Jun. 28, 2021, 8 pages dated.

Chen, D., "Investigation and analysis of residents' travel modes and influencing factors" Science and Technology Innovation Herald, 2014 No. 4, 2 pages.

Ajantha, D. et al., "A user-location vector based approach for personalised tourism and travel recommendation", 2017 International Conference On Big Data Analytics and computational Intelligence (ICBDACI), pp. 440-446.

U.S. Appl. No. 15/115,013 non-Final Office Action dated May 14, 2021, 14 pages.

U.S. Appl. No. 15/900,281, Final Office Action dated Apr. 2, 2021, 46 pages.

* cited by examiner

METHOD AND APPARATUS FOR RECOMMENDING TRAVEL WAY

CROSS-REFERENCE TO RELATED APPLICATION

This application claims priority to and benefits of Chinese Patent Application Serial No. 201910040830.X, filed with the State Intellectual Property Office of P. R. China on Jan. 16, 2019, the entire content of which is incorporated herein by reference.

FIELD

The present disclosure relates to the field of Internet technology, and more particularly, to a method and an apparatus for recommending a travel way.

BACKGROUND

At present, methods for recommending a travel way, typically generate by random an initial vector corresponding to each user, an initial vector corresponding to each travel way, and an initial vector corresponding to each starting-and-arrival pair, perform learning on the above initial vectors in combination with historical travel data, to obtain a vector corresponding to each user, a vector corresponding to each travel way, and a vector corresponding to each starting-and-arrival pair, and perform operation for recommending a travel way in combination with the above obtained vectors.

SUMMARY

Embodiments of the present disclosure provide methods for recommending a travel way. In one embodiment, the method includes: obtaining historical travel data; determining a plurality of correlations between respective travel ways according to the historical travel data, a correlation between two travel ways representing a difference between probabilities for selecting the two travel ways when users of the two travel ways are same and starting-and-arrival pairs of the two travel ways are same; generating a vector corresponding to each travel way according to the plurality of correlations between respective travel ways; performing learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair; and recommending a travel way based on the vector corresponding to each travel way, the vector corresponding to each user and the vector corresponding to each starting-and-arrival pair.

Embodiments of the present disclosure provide an apparatus for recommending a travel way. In one embodiment, the apparatus includes: an obtaining module, a determining module, a generating module, a learning module and a recommending module.

The obtaining module is configured to obtain historical travel data.

The determining module is configured to determine a plurality of correlations between respective travel ways according to the historical travel data, a correlation between two travel ways representing a difference between probabilities for selecting the two travel ways when users of the two travel ways are same and starting-and-arrival pairs of the two travel ways are same.

The generating module is configured to generate a vector corresponding to each travel ways according to the plurality of correlations between respective travel ways.

The learning module is configured to perform learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair.

The recommending module is configured to recommend a travel way based on the vector corresponding to each travel way, the vector corresponding to each user and the vector corresponding to each starting-and-arrival pair.

Embodiments of the present disclosure provide an apparatus for recommending a travel way. The apparatus includes: a memory, a processor and a computer program stored in the memory and executable by the processor. The processor is configured to implement the method for recommending a travel way described above when executing the computer program.

Embodiments of the present disclosure provide a non-transitory computer readable storage medium having a computer program stored thereon. When the computer program is executed by a processor, the method for recommending a travel way described above is implemented.

Additional aspects and advantages of embodiments of the present disclosure will be given in part in the following descriptions, and become apparent in part from the following descriptions, or be learned from the practice of the present disclosure.

BRIEF DESCRIPTION OF THE DRAWINGS

These and other aspects and advantages of the present disclosure will become apparent and more readily appreciated from the following descriptions of embodiments made with reference to the accompanying drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure.

At present, a method for recommending a travel way is, randomly generating an initial vector corresponding to each user, an initial vector corresponding to each travel way, and an initial vector corresponding to each starting-and-arrival pair, performing learning on the above initial vectors in combination with historical travel data, to obtain a vector corresponding to each user, a vector corresponding to each travel way, and a vector corresponding to each starting-and-arrival pair, and performing operation for recommending a travel way in combination with the above obtained vectors.

In the related art, the initial vectors corresponding to respective travel ways are generated randomly, which may be hard to represent heterogeneity among respective travel ways. For example, traveling by bus and traveling by car are suitable for a long distance travel, and traveling on foot and traveling by bicycle are suitable for a close distance travel, such that it is hard for the vectors corresponding to respective travel ways to represent the heterogeneity.

A method and an apparatus for recommending a travel way provided in embodiments of the present disclosure will be described below with reference to the accompanying drawings.

Figure 1:
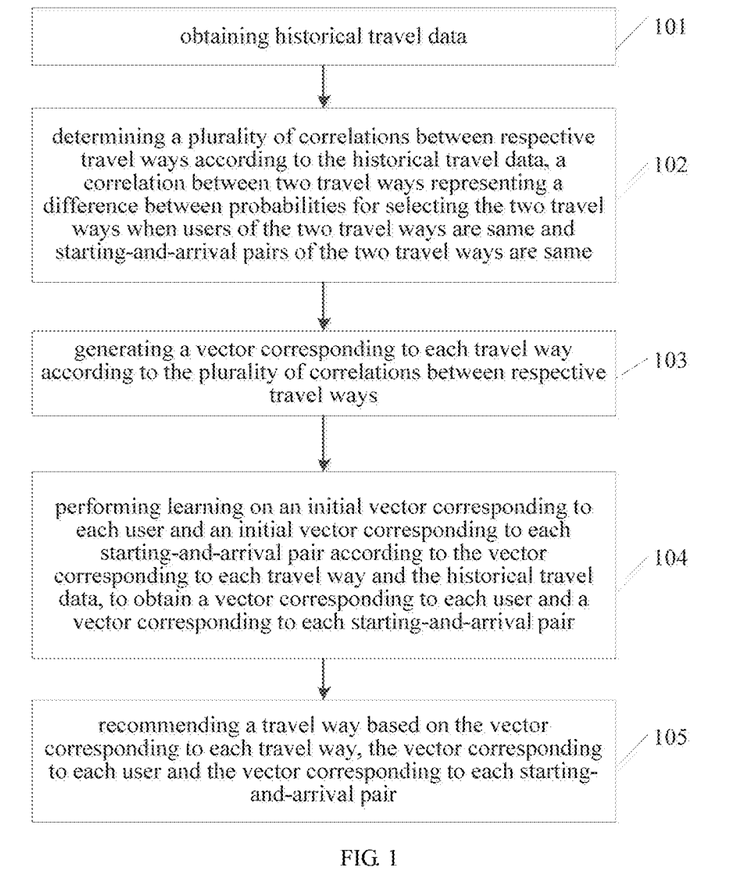
FIG. 1 is a flow chart illustrating a method for recommending a travel way provided in an embodiment of the present disclosure.

FIG. 1 is a flow chart illustrating a method for recommending a travel way provided in an embodiment of the present disclosure. As illustrated in FIG. 1, the method for recommending a travel way includes actions at following blocks.

At block S101, historical travel data is obtained.

An execution subject of the method for recommending a travel way provided by the present disclosure is an apparatus for recommending a travel way. The apparatus for recommending a travel way may be a hardware device such as a terminal device and a server, or software installed in the hardware device. In some embodiments, the historical travel data includes at least one piece of historical travel record. The historical travel record includes a user, a starting-and-arrival pair selected by the user, and a travel way selected by the user. The starting-and-arrival pair refers to a starting position and an arrival position corresponding to each other. The travel way may be such as traveling by bus, traveling by taxi, traveling by car, traveling by bicycle, traveling on foot and the like.

At block S102, a plurality of correlations between respective travel ways are determined according to the historical travel data, and a correlation between two travel ways represents a difference between probabilities for selecting the two travel ways when users of the two travel ways are same and starting-and-arrival pairs of the two travel ways are same.

In this embodiment, a detailed procedure that the apparatus for recommending a travel way executes the actions at block S102 may include: for each travel way, obtaining characteristic information of each travel way according to the historical travel data, the characteristic information including: a frequency of selecting the travel way by each user and a frequency of employing the travel way for each starting-and-arrival pair; generating a characteristic vector of the travel way according to the characteristic information of the travel way; calculating a similarity between characteristic vectors of each two travel ways according to characteristic vectors of respective travel ways; and determining the similarity between the characteristic vectors of the each two travel ways as the correlation between the two travel ways.

In this embodiment, for example, the characteristic vector may be represented by:

$$f_{mi}=[u_{i1},u_{i2},\ldots,u_{in},od_{i1},od_{i2},\ldots,od_{in}] \quad (1),$$

where, $f_{mi}$ represents a characteristic vector of a travel way mi, $u_{in}$ represents a frequency of employing the travel way mi by user n in the historical travel data; and $od_{in}$ represents a frequency of using the travel way mi for a starting-and-arrival pair $od_n$ in the historical travel data.

In this embodiment, for example, an equation for calculating the similarity between the characteristic vectors may be represented by following equation (2).

$$rel(m_i, m_j) = \frac{\langle f_{mi}, f_{mj} \rangle}{\|f_{mi}\|\|f_{mj}\|} \quad (2)$$

$rel(m_i,m_j)$ represents a similarity between a characteristic vector corresponding to the travel way mi and a characteristic vector corresponding to the travel way mi.

Figure 2:
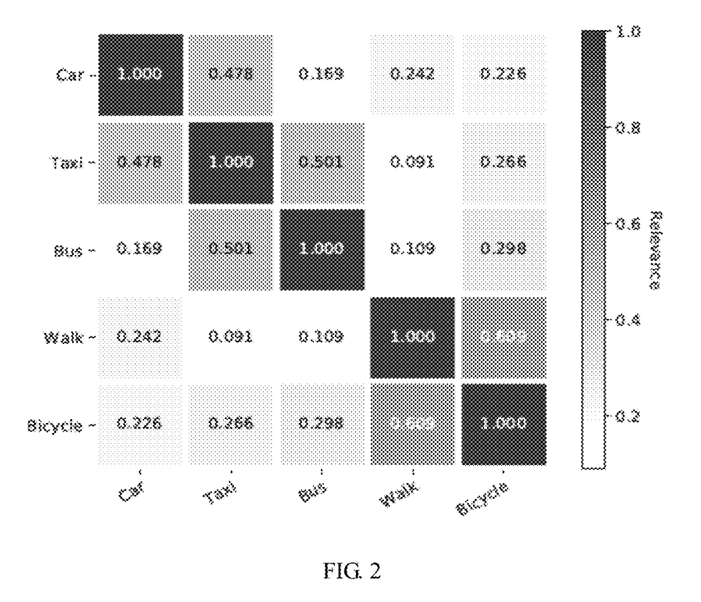
FIG. 2 is a schematic diagram illustrating a correlation matrix.

In this embodiment, after the plurality of correlations between respective travel ways are obtained, a correlation matrix may be generated according to the plurality of correlations between respective travel ways. As illustrated in FIG. 2, a correlation between traveling by bicycle and traveling on foot (i.e., walk in FIG. 2) is 0.609, and a correlation between traveling on foot and travelling by car is 0.242.

At block S103, a vector corresponding to each travel way is generated according to the plurality of correlations between respective travel ways.

In this embodiment, a detailed procedure that the apparatus for recommending a travel way executes the actions at block 103 may include: obtaining a first travel way and a second travel way corresponding to a maximum correlation of the plurality of correlations between respective travel ways; generating a vector corresponding to the first travel way and a vector corresponding to the second travel way randomly; obtaining a third travel way based on a preset selection way, the preset selection way including maximizing a sum of correlations between the travel way to be selected and each selected travel way; generating a vector corresponding to the third travel way, such that a similarity relationship among the vectors corresponding to the first travel way, the second travel way and the third travel way satisfies a correlation relationship among the first travel way, the second travel wan and the third travel way; and obtaining a fourth travel way based on the preset selection way, and generating a vector corresponding to the fourth travel; repeating above procedure until vectors corresponding to all travel ways are generated.

For example, it is assumed that the vector corresponding to the first travel way has d dimensions. A procedure for generating the vector corresponding to first travel way randomly may include: extracting d pieces of data from a uniform distribution randomly as values of the respective d dimensions of the vector corresponding to the first travel way, such that the vector corresponding to the first travel way is obtained. The vector corresponding to the second travel way may also be obtained by employing the above procedure. For example, the uniform distribution may be represented by $$\left[-\frac{1}{2d}, \frac{1}{2d}\right]. \quad (3)$$

In this embodiment, after the vector corresponding to the first travel way and the vector corresponding to the second travel way are generated, for each of remaining travel ways, a first correlation between each of the remaining travel ways and the first travel way, and a second correlation between each of the remaining travel ways and the second travel way may be obtained. A sum of the first correlation and the second correlation is calculated as a current correlation of the corresponding remaining travel way. A travel way corresponding to a maximum current correlation is determined as the third travel way, and the vector corresponding to the third travel way is generated randomly.

In this embodiment, when the vector corresponding to the third travel way is generated, there is a need to verify whether a similarity relationship among the vectors corresponding to the three travel ways (i.e., the first travel way, the second travel wan and the third travel way) satisfies a correlation relationship among the three travel ways. In detail, it is assumed that the first travel way is traveling by bicycle, the second travel way is traveling on foot, and the third travel way is traveling by car. If the correlation relationship among the three travel ways is that: a correlation between traveling by car and traveling on foot is greater than a correlation between traveling by car and traveling by bicycle, the similarity relationship among vectors corresponding to the three travel ways needs to satisfy that: a similarity between the vectors corresponding to traveling by car and traveling on foot is greater than a similarity between the vectors corresponding to traveling by car and traveling by bicycle. When the similarity relationship among the vectors corresponding to the three travel ways does not conform to the above condition, the vectors corresponding to the three travel ways may be adjusted until the similarity relationship among the vectors corresponding to the three travel ways conforms to the above condition.

In addition, after the vector corresponding to the third travel way is generated, for each of the remaining travel ways, a first correlation between each of the remaining travel ways and the first travel way, a second correlation between each of the remaining travel ways and the second travel way and a third correlation between each of the remaining travel ways and the third travel way may be obtained, and a sum of the three correlations (i.e., the first correlation, the second correlation and the third correlation) are obtained as a current correlation of the corresponding remaining travel way. A travel way corresponding to a maximum current correlation is determined as a fourth travel way, and a vector corresponding to the fourth travel way is generated randomly.

In this embodiment, it is assumed that the fourth travel way is traveling by taxi, a similarity relationship among the vectors corresponding to the four travel ways (i.e., the first travel way, the second travel way, the third travel way, and the fourth travel way) needs to conform to that: a similarity between the vectors corresponding to traveling by car and traveling by taxi is greater than a similarity between the vectors corresponding to traveling by taxi and traveling by bicycle; and a similarity between the vectors corresponding to traveling by taxi and traveling by bicycle is greater than a similarity between the vectors corresponding to traveling by taxi and traveling on foot. With reference to the above method, a fifth travel way and a vector corresponding to the fifth travel may be obtained, and so on.

At block S104, learning is performed on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair.

In this embodiment, a detailed procedure that the apparatus for recommending a travel way executes the actions at block S104 may include: obtaining each piece of historical travel record in the historical travel data successively; and adjusting the initial vector corresponding to each user in the historical travel record and the initial vector corresponding to each starting-and-arrival pair in each historical travel record by employing a stochastic gradient descent algorithm according to each piece of historical travel record, to obtain the vector corresponding to each user and the vector corresponding to each starting-and-arrival pair.

The initial vector corresponding to each user in the historical travel record and the initial vector corresponding to each starting-and-arrival pair in the historical travel record are adjusted by employing the stochastic gradient descent algorithm according to each piece of historical travel record, such that a travel way selected by the user in the historical travel record may be recommended when a travel way is recommended to the user according to the user and the starting-and-arrival pair in the historical travel record.

At block S105, a travel way is recommended according to the vector corresponding to each travel way, the vector corresponding to each user and the vector corresponding to each pair of the starting position and the arrival position.

In this embodiment, a detailed procedure that the apparatus for recommending a travel way executes the actions at block 105 may include: obtaining a recommendation request, the recommendation request including a user and a starting-and-arrival pair; obtaining a vector corresponding to the user and a vector corresponding to the starting-and-arrival pair; calculating a first similarity between the vector corresponding to the user and the vector corresponding to each travel way, and calculating a second similarity between the vector corresponding to the starting-and-arrival pair and the vector corresponding to each travel way; and selecting a travel way to be recommended from the respective travel ways based on the first similarity and the second similarity.

For example, for each travel way, a weighted summation is performed on the first similarity and the second similarity corresponding to the travel way, to obtain a total similarity corresponding to the travel way, and a travel way corresponding to a maximum total similarity is taken as a travel way to be recommended, and is recommended to the user.

With the method for recommending a travel way according to embodiments of the present disclosure, the historical travel data is obtained, the plurality of correlations between respective travel ways are determined according to the historical travel data, the correlation between two travel ways representing the difference between the probabilities for selecting the two travel ways when the users of the two travel ways are same and starting-and-arrival pairs of the two travel ways are same, the vector corresponding to each travel way is generated according to the plurality of correlations between respective travel ways, the learning is performed on the initial vector corresponding to each user and the initial vector corresponding to each starting-and-arrival pair according to the vector corresponding to each travel way and the historical travel data, to obtain the vector corresponding to each user and the vector corresponding to each starting-and-arrival pair, and the travel way is recommended according to the vector corresponding to each travel way, the vector corresponding to each user and the vector corresponding to each starting-and-arrival pair. The vectors corresponding to respective travel ways may be generated according to similarities among respective travel ways, which may represent heterogeneity among respective travel ways, such that a suitable travel way may be recommended to the user with reference to the vectors corresponding to respective travel ways, improving the accuracy and the efficiency for recommending the travel way.

Figure 3:
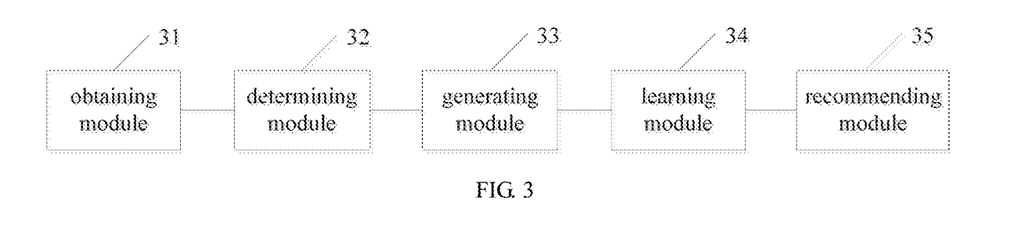
FIG. 3 is a block diagram illustrating an apparatus for recommending a travel way provided in an embodiment of the present disclosure.

FIG. 3 is a block diagram illustrating an apparatus for recommending a travel way provided in an embodiment of the present disclosure. As illustrated in FIG. 3, the apparatus includes an obtaining module 31, a determining module 32, a generating module 33, a learning module 34 and a recommending module 35.

The obtaining module 31 is configured to obtain historical travel data.

The determining module 32 is configured to determine a plurality of correlations between respective travel ways according to the historical travel data, a correlation between two travel ways representing a difference between probabilities for selecting the two travel ways when users of the two travel ways are same and starting-and-arrival pairs of the two travel ways are same.

The generating module 33 is configured to generate a vector corresponding to each travel way according to the plurality of correlations between respective travel ways.

The learning module 34 is configured to perform learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair.

The recommending module 35 is configured to recommend a travel way based on the vector corresponding to each travel way, the vector corresponding to each user and the vector corresponding to each starting-and-arrival pair.

The apparatus for recommending a travel way may be a hardware device such as a terminal device and a server, or software installed in the hardware device. In some embodiments, the historical travel data includes at least one piece of historical travel record. The historical travel record includes a user, a starting-and-arrival pair selected by the user, and a travel way selected by the user. The starting-and-arrival pair refers to a starting position and an arrival position corresponding to each other. The travel way may be such as traveling by bus, traveling by taxi, traveling by car, traveling by bicycle, traveling on foot and the like.

In this embodiment, the determining module 32 may be configured to, for each travel way, obtain characteristic information of the travel way according to the historical travel data, the characteristic information including: a frequency of selecting the travel way by each user and a frequency of employing the travel way for each starting-and-arrival pair; generate a characteristic vector of the travel way according to the characteristic information of the travel way; calculate a similarity between characteristic vectors of each two travel ways according to characteristic vectors of respective travel ways; and determine the similarity between the characteristic vectors of the each two travel ways as the correlation between the two travel ways.

In this embodiment, for example, the characteristic vector may be represented by:

$$f_{mi}=[u_{i1}, u_{i2}, \ldots, u_{in}, od_{i1}od_{i2}, \ldots, od_{in}] \quad (1),$$

where, $f_{mi}$ represents a characteristic vector of a travel way mi, $u_{in}$ represents a frequency of employing the travel way mi by user n in the historical travel data; and $od_{in}$ represents a frequency of using the travel way mi for a starting-and-arrival pair $od_n$ in the historical travel data.

In this embodiment, for example, an equation for calculating the similarity between the characteristic vectors may be represented by following equation (2).

$$rel(m_i, m_j) = \frac{\langle f_{mi}, f_{mj} \rangle}{\|f_{mi}\|\|f_{mj}\|} \quad (2)$$

$rel(m_i, m_j)$ represents a similarity between a characteristic vector corresponding to the travel way mi and a characteristic vector corresponding to the travel way mi.

In this embodiment, after the plurality of correlations between respective travel ways are obtained, a correlation matrix may be generated according to the plurality of correlations between respective travel ways. As illustrated in FIG. 2, a correlation between traveling by bicycle and traveling on foot is 0.609, and a correlation between traveling on foot and travelling by car is 0.242.

Further, on the basis of the above embodiments, the generating module 33 may be configured to: obtain a first travel way and a second travel way corresponding to a maximum correlation of the plurality of correlations between respective travel ways; generate a vector corresponding to the first travel way and a vector corresponding to the second travel way randomly; obtain a third travel way based on a preset selection way, the preset selection way including maximizing a sum of correlations between the travel way to be selected and each selected travel way; generate a vector corresponding to the third travel way, such that a similarity relationship among the vectors corresponding to the first travel way, the second travel way and the third travel way satisfies a correlation relationship among the first travel way, the second travel wan and the third travel way; and obtain a fourth travel way based on the preset selection way, and generate a vector corresponding to the fourth travel way, until vectors corresponding to all travel ways are generated.

For example, it is assumed that the vector corresponding to the first travel way has d dimensions. A procedure for generating the vector corresponding to first travel way randomly may include: extracting d pieces of data from a uniform distribution randomly as values of the respective d dimensions of the vector corresponding to the first travel way, such that the vector corresponding to the first travel way is obtained. The vector corresponding to the second travel way may also be obtained by employing the above procedure.

In this embodiment, after the vector corresponding to the first travel way and the vector corresponding to the second travel way are generated, for each of remaining travel ways, a first correlation between each of the remaining travel ways and the first travel way, and a second correlation between each of the remaining travel ways and the second travel way may be obtained. A sum of the first correlation and the second correlation is calculated as a current correlation of the corresponding remaining travel way. A travel way corresponding to a maximum current correlation is determined as the third travel way, and the vector corresponding to the third travel way is generated randomly.

In this embodiment, when the vector corresponding to the third travel way is generated, there is a need to verify whether a similarity relationship among the vectors corresponding to the three travel ways (i.e., the first travel way, the second travel wan and the third travel way) satisfies a correlation relationship among the three travel ways. In detail, it is assumed that the first travel way is traveling by bicycle, the second travel way is traveling on foot, and the third travel way is traveling by car. If the correlation relationship among the three travel ways is that: a correlation between traveling by car and traveling on foot is greater than a correlation between traveling by car and traveling by bicycle, the similarity relationship among vectors corresponding to the three travel ways needs to satisfy that: a similarity between the vectors corresponding to traveling by car and traveling on foot is greater than a similarity between the vectors corresponding to traveling by car and traveling by bicycle. When the similarity relationship among the vectors corresponding to the three travel ways does not conform to the above condition, the vectors corresponding to the three travel ways may be adjusted until the similarity relationship among the vectors corresponding to the three travel ways conforms to the above condition.

In addition, after the vector corresponding to the third travel way is generated, for each of the remaining travel ways, a first correlation between each of the remaining travel ways and the first travel way, a second correlation between each of the remaining travel ways and the second travel way and a third correlation between each of the remaining travel ways and the third travel way may be obtained, and a sum of the three correlations (i.e., the first correlation, the second correlation and the third correlation) are obtained as a current correlation of the corresponding remaining travel way. A travel way corresponding to a maximum current correlation is determined as a fourth travel way, and a vector corresponding to the fourth travel way is generated randomly.

In this embodiment, it is assumed that the fourth travel way is traveling by taxi, a similarity relationship among the vectors corresponding to the four travel ways (i.e., the first travel way, the second travel way, the third travel way, and the fourth travel way) needs to conform to that: a similarity between the vectors corresponding to traveling by car and traveling by taxi is greater than a similarity between the vectors corresponding to traveling by taxi and traveling by bicycle; and a similarity between the vectors corresponding to traveling by taxi and traveling by bicycle is greater than a similarity between the vectors corresponding to traveling by taxi and traveling on foot. With reference to the above method, a fifth travel way and a vector corresponding to the fifth travel may be obtained, and so on.

Further, on the basis of the above embodiments, the learning module 34 may be configured to: obtain each piece of historical travel record in the historical travel data successively; and adjust the initial vector corresponding to each user in the historical travel record and the initial vector corresponding to each starting-and-arrival pair in each historical travel record by employing a stochastic gradient descent algorithm according to each piece of historical travel record, to obtain the vector corresponding to each user and the vector corresponding to each starting-and-arrival pair.

The initial vector corresponding to each user in the historical travel record and the initial vector corresponding to each starting-and-arrival pair in the historical travel record are adjusted by employing the stochastic gradient descent algorithm according to each piece of historical travel record, such that a travel way selected by the user in the historical travel record may be recommended when a travel way is recommended to the user according to the user and the starting-and-arrival pair in the historical travel record.

Further, on the basis of the above embodiments, the recommending module 35 is configured to: obtain a recommendation request, the recommendation request including a user and a starting-and-arrival pair; obtain a vector corresponding to the user and a vector corresponding to the starting-and-arrival pair; calculate a first similarity between the vector corresponding to the user and the vector corresponding to each travel way, and calculating a second similarity between the vector corresponding to the starting-and-arrival pair and the vector corresponding to each travel way; and select a travel way to be recommended from the respective travel ways based on the first similarity and the second similarity.

For example, for each travel way, a weighted summation is performed on the first similarity between the vector corresponding to the user and the vector corresponding to the starting-and-arrival pair and the second similarity between the vector corresponding to the starting-and-arrival pair and the vector corresponding to the travel way, to obtain a total similarity corresponding to the travel way, and a travel way corresponding to a maximum total similarity is taken as a travel way to be recommended, and is recommended to the user.

With the apparatus for recommending a travel way according to embodiments of the present disclosure, the historical travel data is obtained, the plurality of correlations between respective travel ways are determined according to the historical travel data, the correlation between two travel ways representing the difference between the probabilities for selecting the two travel ways when the users of the two travel ways are same and starting-and-arrival pairs of the two travel ways are same, the vector corresponding to each travel way is generated according to the plurality of correlations between respective travel ways, the learning is performed on the initial vector corresponding to each user and the initial vector corresponding to each starting-and-arrival pair according to the vector corresponding to each travel way and the historical travel data, to obtain the vector corresponding to each user and the vector corresponding to each starting-and-arrival pair, and the travel way is recommended according to the vector corresponding to each travel way, the vector corresponding to each user and the vector corresponding to each starting-and-arrival pair. The vectors corresponding to respective travel ways may be generated according to similarities among respective travel ways, which may represent heterogeneity among respective travel ways, such that a suitable travel way may be recommended to the user with reference to the vectors corresponding to respective travel ways, improving the accuracy and the efficiency for recommending the travel way.

Figure 4:
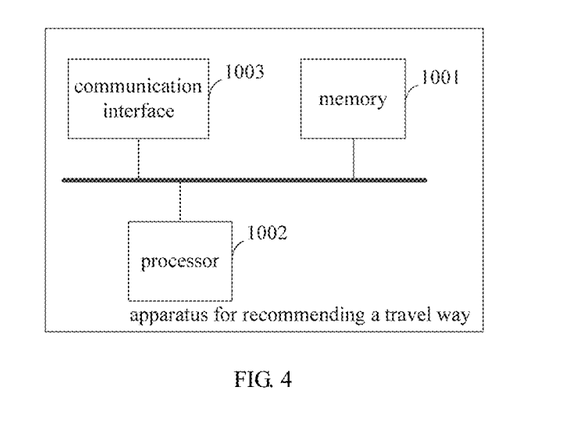
FIG. 4 is a block diagram illustrating an apparatus for recommending a travel way provided in another embodiment of the present disclosure.

FIG. 4 is a block diagram illustrating another apparatus for recommending a travel way provided in an embodiment of the present disclosure. The apparatus for recommending a travel way includes a memory 1001, a processor 1002 and a computer program stored in the memory 1001 and executable by the processor 1002.

The processor 1002 is configured to implement the method for recommending a travel way according to the above embodiments when executing the computer program.

Further, the apparatus for recommending a travel way further includes a communication interface 1003. The communication interface 1003 is configured for communication between the memory 1001 and the processor 1002.

The memory 1001 is configured to store the computer program executable by the processor 1002.

The memory 1001 may include a high-speed RAM memory, and may also include a non-volatile memory, such as at least one disk memory.

The processor 1002 is configured to implement the method for recommending a travel way according to the above embodiments when executing the computer program.

When the memory 1001, the processor 1002 and the communication interface 1003 are implemented independently, the communication interface 1003, the memory 1001 and the processor 1002 may be coupled to each other via a bus and communicate with each other. The bus may be an industry standard architecture (ISA) bus, a peripheral component interconnect (PCI) bus, an extended industry standard architecture (EISA) or the like. The bus may be divided into an address bus, a data bus, a control bus, etc. For representation easily, in FIG. 4, only one thick line is used, but it does not mean that there is only one bus or one type of bus.

Alternatively, in detailed implementation, when the memory 1001, the processor 1002 and the communication interface 1003 are integrated in a chip for implementing, the memory 1001, the processor 1002 and the communication interface 1003 may complete the communication between each other via an internal interface.

The processor 1002 may be a central processing unit (CPU) or an application specific integrated circuit (ASIC), or be configured as one or more integrated circuits configured to implement embodiments of the present disclosure.

The present disclosure further provides a non-transitory computer readable storage medium having a computer programs stored thereon. When the computer program is configured to be executed by a processor, the method for recommending a travel way is implemented.

The present disclosure further provides a computer program product. When instructions in the computer program product are executed by a processor, the method for recommending a travel way is implemented.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples in the specification can be combined by those skilled in the art.

In addition, terms such as "first" and "second" are used herein for purposes of description and are not intended to indicate or imply relative importance or implicitly indicate the number of indicated technical features. Furthermore, the feature defined with "first" and "second" may include one or more this feature distinctly or implicitly. In the description of the present disclosure, "a plurality of" means at least two, such as two, three, unless specified otherwise.

Any procedure or method described in the flow charts or described in any other way herein may be understood include one or more modules, portions or parts for executing instruction codes that implement steps of a custom logic function or procedure. And preferable embodiments of the present disclosure includes other implementation, in which the order of execution is different from what is depicted or discussed, including executing functions in a substantially simultaneous manner or in an opposite order according to the related functions, which may be understood by the skilled in the art of embodiments of the present disclosure.

The logic and/or step described in other manners herein or shown in the flow chart, for example, a particular sequence table of executable instructions for realizing the logical function, may be specifically achieved in any computer readable medium to be used by the instruction execution system, device or equipment (such as a system based on computers, a system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exhaustive list) of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

The skilled in the art may understand that implementing all or a part of steps carried by the method of the above embodiments may be completed by a program indicating the related hardware. The program may be stored in a computer readable storage medium. The program includes one of the embodiments of the method or the combination thereof when being executed.

In addition, respective function units in respective embodiments of the present disclosure can be integrated in one processing unit, or each unit can also exist physically alone, or two or more units may be integrated in one unit. The foregoing integrated unit may be implemented either in hardware or software functional units. If the integrated unit is implemented as a software functional unit and is sold or used as a stand-alone product, it may be stored in a computer readable storage medium.

The above mentioned storage medium may be a ROM, a disk or a disc. Although embodiments of the present disclosure have been shown and described above, it should be understood that, the above embodiments are exemplary, and cannot be understood to limit the present disclosure. Those skilled in the art can make changes, alternatives, and modifications in the above embodiments within scope of the present disclosure.

What is claimed is:

1. A method for recommending a travel way, comprising:
obtaining historical travel data;
determining a correlation between each two travel ways of a plurality of travel ways in the historical travel data according to the historical travel data, the correlation between each two travel ways representing a difference between probabilities for selecting the two travel ways when users of the two travel ways are same and starting-and-arrival pairs of the two travel ways are same;

generating a vector corresponding to each travel way according to the correlation between each two travel ways;

performing learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair; and recommending a travel way based on the vector corresponding to each travel way, the vector corresponding to each user and the vector corresponding to each starting-and-arrival pair, wherein performing the learning on the initial vector corresponding to each user and the initial vector corresponding to each starting-and-arrival pair according to the vector corresponding to each travel way and the historical travel data comprises:

obtaining each piece of historical travel record in the historical travel data successively; and adjusting the initial vector corresponding to each user in the historical travel record and the initial vector corresponding to each starting-and-arrival pair in each historical travel record by employing a stochastic gradient descent algorithm according to each piece of historical travel record, to obtain the vector corresponding to each user and the vector corresponding to each starting-and-arrival pair.

2. The method of claim 1, wherein the historical travel data comprises at least one piece of historical travel record; a piece of historical travel record comprises a user, a starting-and-arrival pair selected by the user, and a travel way selected by the user; and determining the plurality of correlations between respective travel ways according to the historical travel data comprises:

for each travel way, obtaining characteristic information of the travel way according to the historical travel data, the characteristic information comprising a frequency of selecting the travel way by each user and a frequency of employing the travel way for each starting-and-arrival pair;

generating a characteristic vector of the travel way according to the characteristic information of the travel way;

calculating a similarity between characteristic vectors of each two travel ways according to characteristic vectors of respective travel ways; and determining the similarity between the characteristic vectors of the each two travel ways as the correlation between the two travel ways.

3. The method of claim 1, wherein generating the vector corresponding to each travel way according to the plurality of correlations between respective travel ways comprises:

obtaining a first travel way and a second travel way corresponding to a maximum correlation of the plurality of correlations between respective travel ways;

generating a vector corresponding to the first travel way and a vector corresponding to the second travel way randomly;

obtaining a third travel way based on a preset selection way, the preset selection way comprising maximizing a sum of correlations between the travel way to be selected and each selected travel way;

generating a vector corresponding to the third travel way, such that a similarity relationship among the vectors corresponding to the first travel way, the second travel way and the third travel way satisfies a correlation relationship among the first travel way, the second travel wan and the third travel way; and obtaining a fourth travel way based on the preset selection way, and generating a vector corresponding to the fourth travel until vectors corresponding to all of the respective travel ways are generated.

4. The method according to claim 1, wherein recommending the travel way based on the vector corresponding to each travel way, the vector corresponding to each user and the vector corresponding to each starting-and-arrival pair comprises:

obtaining a recommendation request, the recommendation request comprising a user and a starting-and-arrival pair;

obtaining a vector corresponding to the user and a vector corresponding to the starting-and-arrival pair;

calculating a first similarity between the vector corresponding to the user and the vector corresponding to each travel way, and calculating a second similarity between the vector corresponding to the starting-and-arrival pair and the vector corresponding to each travel way; and selecting a travel way to be recommended from the respective travel ways based on the first similarity and the second similarity.

5. The method according to claim 4, wherein selecting the travel way to be recommended from the respective travel ways based on the first similarity and the second similarity comprises:

performing a weighted summation on the first similarity and the second similarity corresponding to each of the respective travel ways, to obtain a total similarity corresponding to each of the respective travel ways;

determining a travel way corresponding to a maximum total similarity as a travel way to be recommended.

6. An apparatus for recommending a travel way, comprising: a memory, a processor and a computer program stored in the memory and executable by the processor, wherein, the processor is configured to implement a method for recommending a travel way when executing the computer program, the method comprising:

obtaining historical travel data;

determining a correlation between each two travel ways of a plurality of travel ways in the historical travel data according to the historical travel data, the correlation between each two travel ways representing a difference between probabilities for selecting the two travel ways when users of the two travel ways are same and starting-and-arrival pairs of the two travel ways are same;

generating a vector corresponding to each travel way according to the correlation between each two travel ways;

performing learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair; and recommending a travel way based on the vector corresponding to each travel way, the vector corresponding to each user and the vector corresponding to each starting-and-arrival pair, wherein performing the learning on the initial vector corresponding to each user and the initial vector corresponding to each starting-and-arrival pair according to the vector corresponding to each travel way and the historical travel data comprises:

obtaining each piece of historical travel record in the historical travel data successively; and adjusting the initial vector corresponding to each user in the historical travel record and the initial vector corresponding to each starting-and-arrival pair in each historical travel record by employing a stochastic gradient descent algorithm according to each piece of historical travel record, to obtain the vector corresponding to each user and the vector corresponding to each starting-and-arrival pair.

7. The apparatus according to claim 6, wherein the historical travel data comprises at least one piece of historical travel record; a piece of historical travel record comprises a user, a starting-and-arrival pair selected by the user, and a travel way selected by the user; and determining the plurality of correlations between respective travel ways according to the historical travel data comprises:

for each travel way, obtaining characteristic information of the travel way according to the historical travel data, the characteristic information comprising a frequency of selecting the travel way by each user and a frequency of employing the travel way for each starting-and-arrival pair;

generating a characteristic vector of the travel way according to the characteristic information of the travel way;

calculating a similarity between characteristic vectors of each two travel ways according to characteristic vectors of respective travel ways; and determining the similarity between the characteristic vectors of the each two travel ways as the correlation between the two travel ways.

8. The apparatus according to claim 6, wherein generating the vector corresponding to each travel way according to the plurality of correlations between respective travel ways comprises:

obtaining a first travel way and a second travel way corresponding to a maximum correlation of the plurality of correlations between respective travel ways;

generating a vector corresponding to the first travel way and a vector corresponding to the second travel way randomly;

obtaining a third travel way based on a preset selection way, the preset selection way comprising maximizing a sum of correlations between the travel way to be selected and each selected travel way;

generating a vector corresponding to the third travel way, such that a similarity relationship among the vectors corresponding to the first travel way, the second travel way and the third travel way satisfies a correlation relationship among the first travel way, the second travel wan and the third travel way; and obtaining a fourth travel way based on the preset selection way, and generating a vector corresponding to the fourth travel until vectors corresponding to all of the respective travel ways are generated.

9. The apparatus according to claim 6, wherein recommending the travel way based on the vector corresponding to each travel way, the vector corresponding to each user and the vector corresponding to each starting-and-arrival pair comprises:

obtaining a recommendation request, the recommendation request comprising a user and a starting-and-arrival pair;

obtaining a vector corresponding to the user and a vector corresponding to the starting-and-arrival pair;

calculating a first similarity between the vector corresponding to the user and the vector corresponding to each travel way, and calculating a second similarity between the vector corresponding to the starting-and-arrival pair and the vector corresponding to each travel way; and selecting a travel way to be recommended from the respective travel ways based on the first similarity and the second similarity.

10. The apparatus according to claim 9, wherein selecting the travel way to be recommended from the respective travel ways based on the first similarity and the second similarity comprises:

performing a weighted summation on the first similarity and the second similarity corresponding to each of the respective travel ways, to obtain a total similarity corresponding to each of the respective travel ways;

determining a travel way corresponding to a maximum total similarity as a travel way to be recommended.

11. A non-transitory computer readable storage medium having computer programs stored thereon, wherein, when the computer programs are executed by a processor, a method for recommending a travel way is implemented, the method comprising:

obtaining historical travel data;

determining a correlation between each two travel ways of a plurality of travel ways in the historical travel data according to the historical travel data, the correlation between each two travel ways representing a difference between probabilities for selecting the two travel ways when users of the two travel ways are same and starting-and-arrival pairs of the two travel ways are same;

generating a vector corresponding to each travel way according to the correlation between each two travel ways;

performing learning on an initial vector corresponding to each user and an initial vector corresponding to each starting-and-arrival pair according to the vector corresponding to each travel way and the historical travel data, to obtain a vector corresponding to each user and a vector corresponding to each starting-and-arrival pair; and recommending a travel way based on the vector corresponding to each travel way, the vector corresponding to each user and the vector corresponding to each starting-and-arrival pair, wherein performing the learning on the initial vector corresponding to each user and the initial vector corresponding to each starting-and-arrival pair according to the vector corresponding to each travel way and the historical travel data comprises:

obtaining each piece of historical travel record in the historical travel data successively; and adjusting the initial vector corresponding to each user in the historical travel record and the initial vector corresponding to each starting-and-arrival pair in each historical travel record by employing a stochastic gradient descent algorithm according to each piece of historical travel record, to obtain the vector corresponding to each user and the vector corresponding to each starting-and-arrival pair.

12. The storage medium according to claim 11, wherein the historical travel data comprises at least one piece of historical travel record; a piece of historical travel record comprises a user, a starting-and-arrival pair selected by the user, and a travel way selected by the user; and determining the plurality of correlations between respective travel ways according to the historical travel data comprises:

for each travel way, obtaining characteristic information of the travel way according to the historical travel data, the characteristic information comprising a frequency of selecting the travel way by each user and a frequency of employing the travel way for each starting-and-arrival pair;

generating a characteristic vector of the travel way according to the characteristic information of the travel way;

calculating a similarity between characteristic vectors of each two travel ways according to characteristic vectors of respective travel ways; and determining the similarity between the characteristic vectors of the each two travel ways as the correlation between the two travel ways.

13. The storage medium according to claim 11, wherein generating the vector corresponding to each travel way according to the plurality of correlations between respective travel ways comprises:

obtaining a first travel way and a second travel way corresponding to a maximum correlation of the plurality of correlations between respective travel ways;

generating a vector corresponding to the first travel way and a vector corresponding to the second travel way randomly;

obtaining a third travel way based on a preset selection way, the preset selection way comprising maximizing a sum of correlations between the travel way to be selected and each selected travel way;

generating a vector corresponding to the third travel way, such that a similarity relationship among the vectors corresponding to the first travel way, the second travel way and the third travel way satisfies a correlation relationship among the first travel way, the second travel wan and the third travel way; and obtaining a fourth travel way based on the preset selection way, and generating a vector corresponding to the fourth travel until vectors corresponding to all of the respective travel ways are generated.

14. The storage medium according to claim 11, wherein, recommending the travel way based on the vector corresponding to each travel way, the vector corresponding to each user and the vector corresponding to each starting-and-arrival pair comprises:

obtaining a recommendation request, the recommendation request comprising a user and a starting-and-arrival pair;

obtaining a vector corresponding to the user and a vector corresponding to the starting-and-arrival pair;

calculating a first similarity between the vector corresponding to the user and the vector corresponding to each travel way, and calculating a second similarity between the vector corresponding to the starting-and-arrival pair and the vector corresponding to each travel way; and selecting a travel way to be recommended from the respective travel ways based on the first similarity and the second similarity.

15. The storage medium according to claim 14, wherein selecting the travel way to be recommended from the respective travel ways based on the first similarity and the second similarity comprises:

performing a weighted summation on the first similarity and the second similarity corresponding to each of the respective travel ways, to obtain a total similarity corresponding to each of the respective travel ways;

determining a travel way corresponding to a maximum total similarity as a travel way to be recommended.

\* \* \* \* \*